United States Patent Office 2,729,540
Patented Jan. 3, 1956

2,729,540

PROCESS OF PREPARING ALKALI METAL AND ALKALINE EARTH METAL BOROHYDRIDES

Norman Gail Fisher, Wilmington, Del., assignor to E. I. du Pont de Nemours & Company, Wilmington, Del., a corporation of Delaware No Drawing. Application September 24, 1945,
Serial No. 618,411

6 Claims. (Cl. 23—14)

This invention relates to metallic borohydrides and more particularly to a method of preparing borohydrides of alkali or alkaline earth metals.

Although some metallic borohydrides, e. g. beryllium and lithium borohydrides, have been disclosed in the literature (Schlesinger and Brown, J. Am. Chem. Soc. 62, 3429, (1940)) this class of compounds has so far received relatively little attention. Although the metallic borohydrides are of interest as reducing agents, for example in the reduction of salts, e. g. salts of cobalt, silver, zinc, nickel, palladium, to the corresponding metals or metal borides and as hydrogen generating compounds for various uses, they have not been intensively studied, probably, at least in part, because no practical method of preparing them has heretofore been available. Thus, the process previously used to prepare lithium borohydride consisted in reacting ethyllithium with diborane. Both of these starting materials are difficult to prepare and they cannot be conveniently handled in large amounts.

An object of this invention is to provide a practical method of preparing metallic borohydrides in satisfactory yields. Another object is to provide a method of preparing metallic borohydrides which makes use of available and more readily handled starting materials. Other objects will appear hereinafter.

These objects are accomplished by the present invention wherein a mixture of a trialkyl borine and a hydride of an element of groups I-A and II-A of the Periodic Table is hydrogenated and the alkali or alkaline earth metal borohydride so obtained is isolated. Instead of the preformed metal hydride, there may be used the alkali or alkaline earth metal itself, which, it is theorized, is converted to the hydride during the hydrogenation.

The reaction is represented by the following equation:

$$M(H)_x + xBR_3 + 3xH_2 \rightarrow M(BH_4)_x + 3xRH$$

where M represents an alkali or alkaline earth metal, $x$ is 1 or 2 (the valence of M) and R is an alkyl radical.

The invention is illustrated by the following examples, wherein parts are by weight.

Example I

A mixture of 29 parts of triethylborine and 2.4 parts of lithium hydride in 95 parts of cyclohexane was subjected in a stainless steel bomb to a hydrogen pressure of 2900 lbs./sq. in. at 240° C. for 3¾ hours, during which time a hydrogen absorption corresponding to a pressure drop of 800 lbs. was observed. After this time there was no appreciable further hydrogen absorption as indicated by substantial constancy of pressure. Filtration of the reaction mixture gave 4.5 parts of crude lithium borohydride. This material was purified by extracting it with anhydrous ether, which dissolves lithium borohydride, filtering and removing the ether from the filtrate under reduced pressure at 125° C. The residue was lithium borohydride of good purity, obtained as a fluffy white solid decomposing at 272° C. The purity of the lithium borohydride was determined by measuring the volume of hydrogen evolved per gram (4070 cc.) on contact with dilute aqueous acid. The calculated amount is 4120 cc.

Example II

A mixture of 14.1 parts of triethylborine and one part of lithium metal with 60 parts of cyclohexane as the diluent was hydrogenated at 3000 lbs./sq. in. hydrogen pressure and 240° C. for four hours, the hydrogen uptake corresponding to a pressure drop of 500 lbs. After this time there was no appreciable further hydrogen absorption as indicated by substantial constancy of pressure. After removing the diluent by filtration there was obtained 1.6 parts of lithium borohydride as a white, free-flowing powder which needs no further purification. The free flow is characteristic of lithium hydroxydride of good purity.

Example III

A mixture of 11.1 parts of triethylborine and 2.7 parts of sodium metal in 50 parts of cyclohexane was hydrogenated as in Example II. The pressure drop amounted to 300 lbs. Filtration of the reaction mixture gave 3.2 parts of sodium borohydride as a white powder which was purified by extraction with 60 parts of isopropylamine and filtration. The filtrate was evaporated at 0.25 mm. pressure, finishing at 160° C. The residue (2.4 parts) was sodium borohydride of 93.7% purity.

Example IV

A mixture of 3.49 parts of sodium hydride and 14 parts of triethylborine in 50 parts of cyclohexane was hydrogenated as in Example II. There was a pressure drop of 300 lbs. in 3½ hours after which time hydrogen absorption substantially ceased. The white grayish solid obtained by filtering off the diluent was extracted with 60 parts of isopropylamine and the filtrate was evaporated at 0.2 mm. pressure and 100° C. The residue (seven parts) consisted chiefly of sodium borohydride, but purity determination based on hydrogen evolution indicated the presence of impurities, probably compounds of the formula $NaBH_{x+1}(C_2H_5)_{3-x}$, where $x$ is 0, 1, 2 or 3.

Example V

A mixture of 4.2 parts of calcium hydride and 19.5 parts of triethylborine in 100 parts of cyclohexane was hydrogenated as in the preceding examples. A pressure drop of 800–900 lbs. was observed in the course of 3 hours. There was obtained four parts of a brownish solid which consisted of crude calcium borohydride. The presence of substantial amounts of calcium borohydride was shown by the fact that the product reacted completely with water only when acid was added, whereas the starting material, calcium hydride, requires no acid for complete reaction with water. Purified calcium borohydride may be extracted from the crude product by treatment with isopropylamine.

The process of this invention is applicable to any alkali or alkaline earth metal or metal hydride. Presumably, the free metals are converted to the hydrides during the hydrogenation but this has not been demonstrated experimentally. Other trialkyl borines (also called boron trialkyls) may be used, e. g. trimethylborine, triisopropylborine, tri-n-butylborine, etc. It is obviously advantageous to use a trialkyl borine wherein the alkyl radical is that of a lower (i. e. up to six carbons) alcohol, first for economic reasons and also because the hydrocarbon which forms during the reaction is more easily removed from the reaction product. Trialkyl borines are readily prepared, according to published methods, by reacting a boron trihalide with the desired alkylmagnesium halide (Krause and Nitsche, Ber. 54, 2784 (1921); Bent and Dorfman, J. Am. Chem. Soc. 57, 1259 (1934)).

In order that the hydrogenation proceed at a practical rate it is desirable that the reaction temperature be at least about 200° C. and the hydrogen pressure at least about 1500 lbs./sq. in. Upper limits are determined, respectively, by the decomposition temperature of the reactants or products (e. g., about 275° C. for lithium borohydride) and by the pressure that the apparatus can withstand. A solvent or diluent, though not essential, is desirable. Any inert anhydrous solvent can be used, preferably a saturated hydrocarbon such as decahydronaphthalene, gasoline, hexane, etc. or even a hydrocarbon having benzenoid unsaturation such as benzene, toluene, etc. It is sometimes advantageous to carry out the reaction in the presence of a hydrogenation catalyst such as Raney nickel, platinum, etc.

The non-gaseous reactants are preferably used in mole per mole ratio, since an excess of either metal hydride or trialkyl borine tends to make the purification of the borohydride more difficult. The use of finely divided metal hydride or metal facilitates the hydrogenation. When a metal is used which is fusible at the reaction temperature, it need not of course be finely divided.

The reaction products may be isolated by any appropriate method, e. g. filtration from the diluent and excess trialkyl borine, if any. The borohydrides are in general suitable for use without purification. If purification is needed, a convenient method is the extraction of the crude product with a solvent for the metallic borohydride, e. g. anhydrous ether, triethylamine, etc., followed by evaporation of the solvent.

The foregoing detailed description has been given for clearness of understanding only and no unnecessary limitations should be understood therefrom for obvious modifications will occur to a person skilled in the art.

What is claimed is:

1. Process for the preparation of borohydrides of metals of groups I-A and II-A of the periodic system which comprises hydrogenating a mixture of a trialkyl borine with a member of the group consisting of metals of groups I-A and II-A of the periodic system and hydrides of said metals until hydrogen absorption substantially ceases and isolating the metal borohydride.

2. Process for the preparation of an alkali metal borohydride which comprises hydrogenating a mixture of a trialkyl borine with an alkali metal hydride until hydrogen absorption substantially ceases and isolating the metal borohydride.

3. Process which comprises heating a mixture of approximately equimolar amounts of an alkali metal hydride and a trialkyl borine wherein the alkyl groups are each of from one to six carbon atoms in the presence of an inert diluent at a temperature of at least about 200° C. but below the decomposition temperature of the reactants and the borohydride and under a hydrogen pressure of at least about 1500 pounds per square inch until hydrogen absorption substantially ceases and isolating the alkali metal borohydride.

4. Process which comprises heating an approximately equimolar mixture of an alkali metal hydride and triethylborine in an inert diluent at a temperature of at least 200° C. and under a hydrogen pressure of at least 1500 pounds per square inch until hydrogen absorption substantially ceases and isolating the alkali metal borohydride.

5. Process which comprises heating an approximately equimolar mixture of lithium hydride and triethylborine in an inert diluent at a temperature of about 240° C. under a hydrogen pressure of about 2900 pounds per square inch until about three mols of hydrogen per mol of triethylborine is absorbed and isolating the lithium borohydride.

6. Process for the preparation of borohydrides of metals of groups I-A and II-A of the periodic system which comprises hydrogenating a mixture of a trialkyl borine with a member of the group consisting of metals of groups I-A and II-A of the periodic system and hydrides of said metals until about three mols of hydrogen per mol of trialkyl borine is absorbed and isolating the metal borohydride.

No references cited.